(12) United States Patent
Strzala (10) Patent No.: US 12,259,016 B2
(45) Date of Patent: Mar. 25, 2025

(54) BRAKE CALIPER AND SPRING UNIT FOR A BRAKE CALIPER

(71) Applicant: ZF CV Systems Europe BV, Brussels (BE)

(72) Inventor: Wieslaw Strzala, Byczyna (PL)

(73) Assignee: ZF CV Systems Europe BV, Brussels (BE)

( * ) Notice: Subject to any disclaimer, the term of this patent is extended or adjusted under 35 U.S.C. 154(b) by 388 days.

(21) Appl. No.: 17/760,539

(22) PCT Filed: Sep. 17, 2019

(86) PCT No.: PCT/EP2019/074866
§ 371 (c)(1),
(2) Date: Mar. 15, 2022

(87) PCT Pub. No.: WO2021/052568
PCT Pub. Date: Mar. 25, 2021

(65) Prior Publication Data
US 2022/0356922 A1 Nov. 10, 2022

(51) Int. Cl.
*F16D 65/46* (2006.01)
*F16D 55/00* (2006.01)
*F16D 65/00* (2006.01)

(52) U.S. Cl.
CPC ...... *F16D 65/46* (2013.01); *F16D 2055/0016* (2013.01); *F16D 65/0068* (2013.01)

(58) Field of Classification Search
CPC ........ F16D 65/46; F16D 55/46; F16D 65/183; F16D 65/54; F16D 65/56; F16D 55/40;
(Continued)

(56) References Cited

U.S. PATENT DOCUMENTS 4,502,572 A * 3/1985 Davidson ............... F16D 65/567
74/18.2
6,923,297 B1 * 8/2005 Thomas ............... F16J 15/3264
188/196 D
(Continued)

FOREIGN PATENT DOCUMENTS

| DE | 9422342 U1 | 4/2000 |
| DE | 10253642 A1 | 6/2004 |
| WO | 2004102024 A1 | 11/2004 |

OTHER PUBLICATIONS

EP 1039166 A1 (Year: 2000).*
(Continued)

*Primary Examiner* — Robert A. Siconolfi
*Assistant Examiner* — Mahbubur Rashid
(74) *Attorney, Agent, or Firm* — Dickinson Wright PLLC (57) ABSTRACT

A brake caliper for a vehicle disc brake including a pair of brake pads, and brake a disc positioned in between the brake pads is provided. The brake caliper includes a thrust piece that is configured to move at least one of the brake pads relative to the brake disc, an adjuster unit in threaded engagement with the thrust piece, and a spring unit operatively coupled to the adjuster unit and the thrust piece. The spring unit has a latching element and the adjuster unit has a corresponding latching interface, wherein the latching element is arranged to engage the latching interface when the adjuster unit is in threaded engagement with the thrust piece, and the spring unit further has a mounting element in engagement with the thrust piece to provide a resistance against a rotational movement the adjuster unit relative to the thrust piece.

21 Claims, 5 Drawing Sheets

(58) Field of Classification Search
CPC ............. F16D 2127/06; F16D 2127/10; F16D 55/22655; F16D 2055/0016; F16D 2055/0037; F16D 55/06; F16D 65/0068; F16D 25/126
See application file for complete search history.

(56) References Cited

U.S. PATENT DOCUMENTS

| | | | | |
|---|---|---|---|---|
| 7,331,431 | B2* | 2/2008 | Fischer | F16D 65/568 188/71.9 |
| 10,443,667 | B2* | 10/2019 | Schoefberger | F16D 65/183 |
| 10,697,511 | B2* | 6/2020 | Weber | F16D 65/183 |
| 2003/0085082 | A1* | 5/2003 | Severinsson | F16D 65/18 188/73.1 |
| 2005/0034935 | A1* | 2/2005 | Maehara | F16D 65/567 188/71.9 |
| 2006/0118369 | A1* | 6/2006 | Fischer | F16D 65/568 188/218 XL |
| 2011/0203885 | A1* | 8/2011 | Iraschko | F16D 65/568 188/71.8 |
| 2014/0174862 | A1* | 6/2014 | Gruber | B60T 1/065 188/71.9 |
| 2016/0017946 | A1* | 1/2016 | Sandberg | F16D 55/2265 188/71.8 |
| 2018/0259021 | A1* | 9/2018 | Weber | F16D 55/2255 |

OTHER PUBLICATIONS

DE 102016112265 A1 (Jan. 2018) (Year: 2018).*
European Patent Office, Rijswijk, Netherlands, International Search Report of International Application No. PCT/EP2019/074866, Mailed Jun. 4, 2020, 3 pages.

* cited by examiner

BRAKE CALIPER AND SPRING UNIT FOR A BRAKE CALIPER

FIELD

The present disclosure relates to a brake caliper for a vehicle disc brake, in particular, an air disc brake of a commercial vehicle, the brake disc having a pair of brake pads, and a brake disc positioned in between the brake pads. The brake caliper includes a thrust piece movably mounted in an axial direction in the brake caliper. The thrust piece is configured to move at least one of the brake pads relative to the brake disc, an adjuster unit is in threaded engagement with the thrust piece, and a spring unit is operatively coupled to the adjuster unit and the thrust piece. The spring unit is configured to apply a spring force in the axial direction between the thrust piece and the adjuster unit.

BACKGROUND

Brake calipers for vehicle disc brakes are generally known in the art and typically employed in trucks, busses, and bikes. Upon receiving an actuation signal from a brake pedal in the driver cabin or from an electronic control unit, a braking force is generated by a brake cylinder and transmitted to the brake caliper and the thrust piece. In common brake calipers, the thrust piece is part of a clamping unit which is configured to advance the brake pad. After overcoming an air clearance between the brake pads and the brake disc, a frictional force is applied by an inner brake pad advanced by the thrust piece to the rotating brake disc of the brake. At the same time, a frictional force is applied by an outer brake pad advanced by the brake caliper to the brake disc.

In common brake calipers an adjuster unit is used to control the air clearance or air gap between the pair of brake pads and the brake disc.

In common brake calipers, a disc spring is operatively coupled to the adjuster unit and the thrust piece to eliminate or at least minimize the play between the thrust piece and the adjuster unit. Additionally, a retaining ring engaging the thrust piece is used to provide a turning resistance between the thrust piece and the adjuster unit. Such a retaining ring, for example, has a number of bores configured to receive screws in order to couple the retaining ring with a thrust piece.

While these disc springs and additional retaining rings provided a sufficient turning resistance and reduce the play between the thrust piece and the adjuster unit sufficiently, these disc springs are complex to assemble. In some cases where failure of either the disc spring or the retaining ring may occur, said failure could result in a failure of the whole assembly.

SUMMARY

Therefore, it is an object of the present disclosure to provide a brake caliper that overcomes the disadvantages mentioned above as much as possible or to provide at least an alternative to the known solutions. In particular, it was an object to provide a brake caliper with simplified assembly and a higher reliability, preferably without reducing cost efficiency.

The present disclosure attains the aforementioned object by providing that the spring unit has a latching element and the adjuster unit has a corresponding latching interface, wherein the latching element is arranged to engage the latching interface when the adjuster unit is in threaded engagement with the thrust piece, and wherein the spring unit further includes a mounting element in engagement with the thrust piece to provide a resistance against a rotational movement the adjuster unit relative to the thrust piece.

The present disclosure is based upon the realization that by having the spring unit eliminate or at least decrease the play between the adjuster unit and the thrust piece and at the same time provide a resistance against rotation, two functions can be combined while at the same time, reliability may be increased, manufacturing costs are reduced, and the assembly is simplified already due to a reduction of the number of components required for performing said functions.

As the spring unit only engages the adjuster unit when the adjuster unit is in threaded engagement with the thrust piece, the assembly of the thrust piece and the adjuster unit is not impeded.

Preferably, the spring unit is coaxially arranged with the adjuster unit and has a central aperture receiving the adjuster unit at least partly. Thus, the spring unit is easy to orient and arrange with respect to the adjuster unit.

In a preferred embodiment, the spring unit has a ring portion that is conically-shaped and extends radially outwards from the central aperture. Such a ring portion includes an axial extension between an inner circumference defined by the central aperture and an outer circumference provided at a front end facing and engaging the thrust piece. Preferably, the ring portion is resiliently deformable and configured to apply a spring force in the axial direction between the thrust piece and the adjuster unit.

In a further preferred embodiment, the latching element is a first latching element engaging the latching interface at least partly and the spring unit further includes at least one second latching element that is arranged spaced apart from the first latching element in a circumferential direction, wherein the second latching element engages the latching interface at least partly. Thus, by having at least two, preferably three or more in one aspect, latching elements, the reliability is increased as, in the case of failure of one latching element, one or more further latching elements will still engage the latching interface thereby ensuring the functionality.

Preferably, the latching interface is formed as an external thread extending in the axial direction and having multiple of thread pitches, and wherein the latching element is arranged to engage one of the thread pitches. Thus, the latching interface can preferably be provided by the same thread engaging the thrust piece in threaded engagement. Thus, the assembly is simplified and the manufacturing costs are reduced. Further, by engaging an external thread, a good degree of accessibility is provided for the latching elements to engage one of the thread pitches.

In a preferred embodiment, the adjuster unit includes an adjuster screw in threaded engagement with the thrust piece, and wherein the thread forming the latching interface is formed as an external thread of the adjuster screw. Such an adjuster unit provides an easy to manufacture part to couple the adjuster unit and the thrust piece in threaded engagement.

Preferably, the latching element has a curved surface that corresponds to the curvature of one of the thread pitches. By providing that the latching element has a curved surface that corresponds to the curvature of the thread pitch, the present disclosure advantageously recognizes that the spring forces applied by the spring unit are more evenly distributed when transmitted by a curved surface corresponding to the curvature of the thread pitches.

In another aspect, the latching element extends radially inwards and includes a front edge facing the external thread, wherein the front edge is configured for being at least partly received in the thread pitch. Thus, during assembly of the thrust piece and the adjuster unit, and when bringing the adjuster unit and the thrust piece into a threaded engagement, the latching element is resiliently deformed radially outwards, and when the thrust piece and the adjuster unit have been brought into threaded engagement, the latching element will resiliently deform radially inwards again such that the front edge of the latching element is at least partly received in the thread pitch, thereby engaging the thread pitch.

Preferably, the first latching element engages a first thread pitch and the second latching element engages a second thread pitch. Thus, the forces acting between the latching element and the latching interface are more evenly distributed.

In a further preferred embodiment, the thrust piece has a mounting interface corresponding to the mounting element, wherein the mounting interface engages the mounting element in a positive connection. By having a mounting interface, and a corresponding mounting element in a positive connection, the assembly of the thrust piece and the spring unit is simplified.

Preferably, the mounting interface is configured to engage the mounting element upon an axial movement of the spring unit towards the thrust piece. Thus, the spring unit and the thrust piece are easy to assemble, simply by moving the spring unit towards the thrust piece, wherein the adjuster unit is sufficiently secured against a rotational movement relative to the thrust piece.

Further preferred, the mounting element extends radially outwards, and the mounting interface is sized and shaped to receive the mounting element at least partly. By providing that the mounting element extends radially outwards, the location of engagement of the mounting element and the mounting interface is spaced apart from the engagement of the latching element and the latching interface. Thus, the engagement between the spring unit and the thrust piece does not impede the engagement of the spring unit and the adjuster unit.

Particularly preferred, the thrust piece has a recess corresponding to the spring unit and is configured to receive the spring unit at least partly. Thus, the orientation and arrangement of the spring unit relative to the thrust piece is simplified.

The present disclosure has been described above in a first aspect with respect to a brake caliper.

In a second aspect, the present disclosure also relates to a spring unit for a brake caliper of a vehicle disc brake, preferably a brake caliper according to the preferred embodiments described above, wherein the spring unit is configured to be operatively coupled to an adjuster unit and a thrust piece of the brake caliper and configured to apply a spring force in an axial direction between the thrust piece and the adjuster unit.

According to the second aspect, the present disclosure achieves the initially mentioned object in that the spring unit includes a latching element arranged to engage a latching interface of the adjuster unit when the adjuster unit is in threaded engagement with a thrust piece, and in that the spring unit includes a mounting element configured to be in engagement with the thrust piece to provide a resistance against a rotational movement the adjuster unit relative to the thrust piece. The benefits and preferred embodiments of the brake caliper of the first aspect as described above are also the preferred embodiments and benefits of the spring unit of the second aspect, and vice versa.

For a more complete understanding of the present disclosure, the present disclosure will now be described in detail with reference to the accompanying drawings. The detailed description will illustrate and describe what is considered as a preferred embodiment of the present disclosure. It should of course be understood that various modifications and changes in form or detail could readily be made without departing from the spirit of the invention according to the present disclosure. It is therefore intended that the invention may not be limited to the exact form and detail shown and described herein, nor to anything less than the whole of the invention disclosed herein and as claimed hereinafter. Further, the features described in the description, the drawings, and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does not exclude a plurality.

BRIEF DESCRIPTION OF THE DRAWINGS

This invention will now be described with reference to the accompanying drawings which illustrate, by way of example and not by way of limitation, one of several possible embodiments of the vehicle disc brake proposed herein, and wherein, in the drawings, FIG. 1 schematically illustrates a brake caliper in a sectional view, FIG. 2 schematically illustrates a part of the brake caliper, according to FIG. 1 in a perspective view, FIG. 3 schematically illustrates a part of the brake caliper in a sectional view, according to FIG. 1.

DETAILED DESCRIPTION OF THE DRAWINGS

Figure 1:
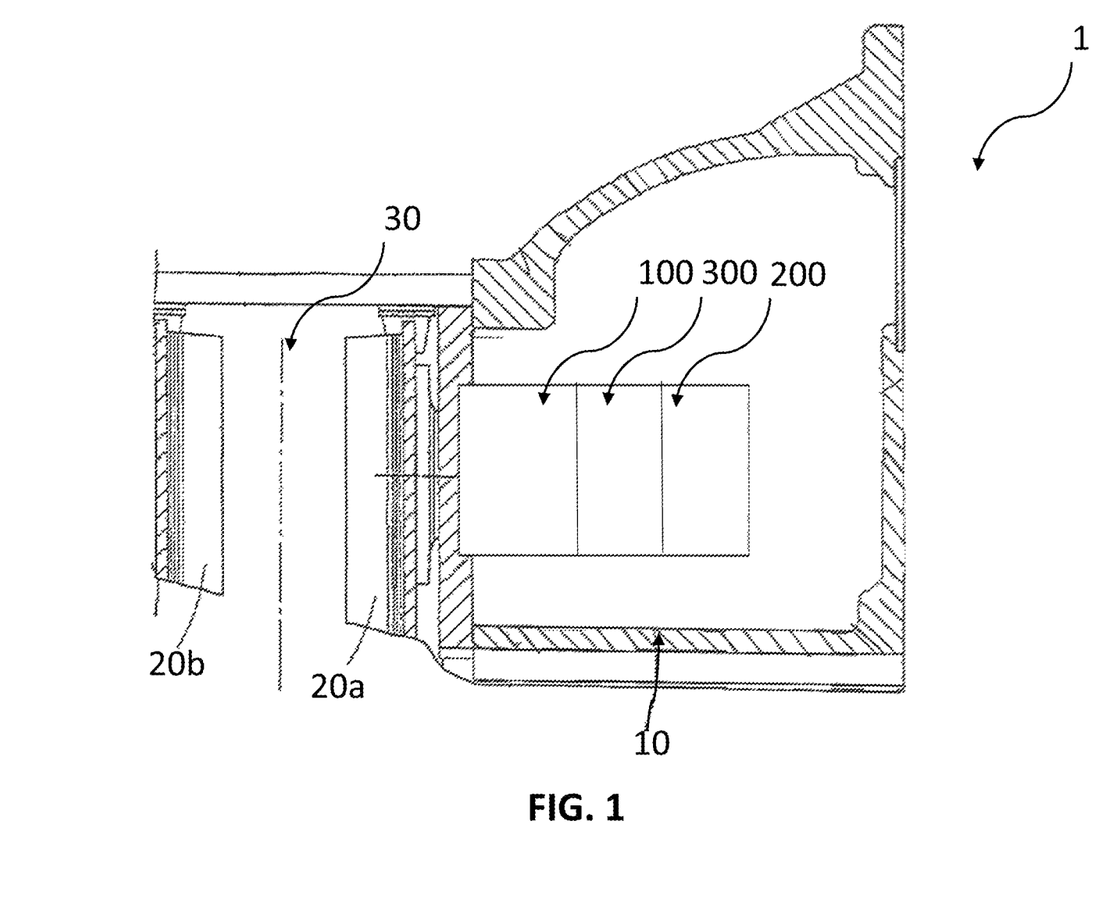

FIG. 1 illustrates a vehicle brake 1 having a brake caliper 10, a pair of brake pads 20a, b and a brake disc 30 arranged in between the brake pads 20a, 20b.

The brake caliper 10 includes a clamping unit 100, an adjuster unit 200, and a spring unit 300.

The inner brake pad 20a is operatively coupled to the clamping unit 100. At least a part of the clamping unit 100 is in engagement with the adjuster unit 200. The spring unit 300 is operatively coupled to the adjuster unit 200 and the clamping unit 100.

Figure 2:
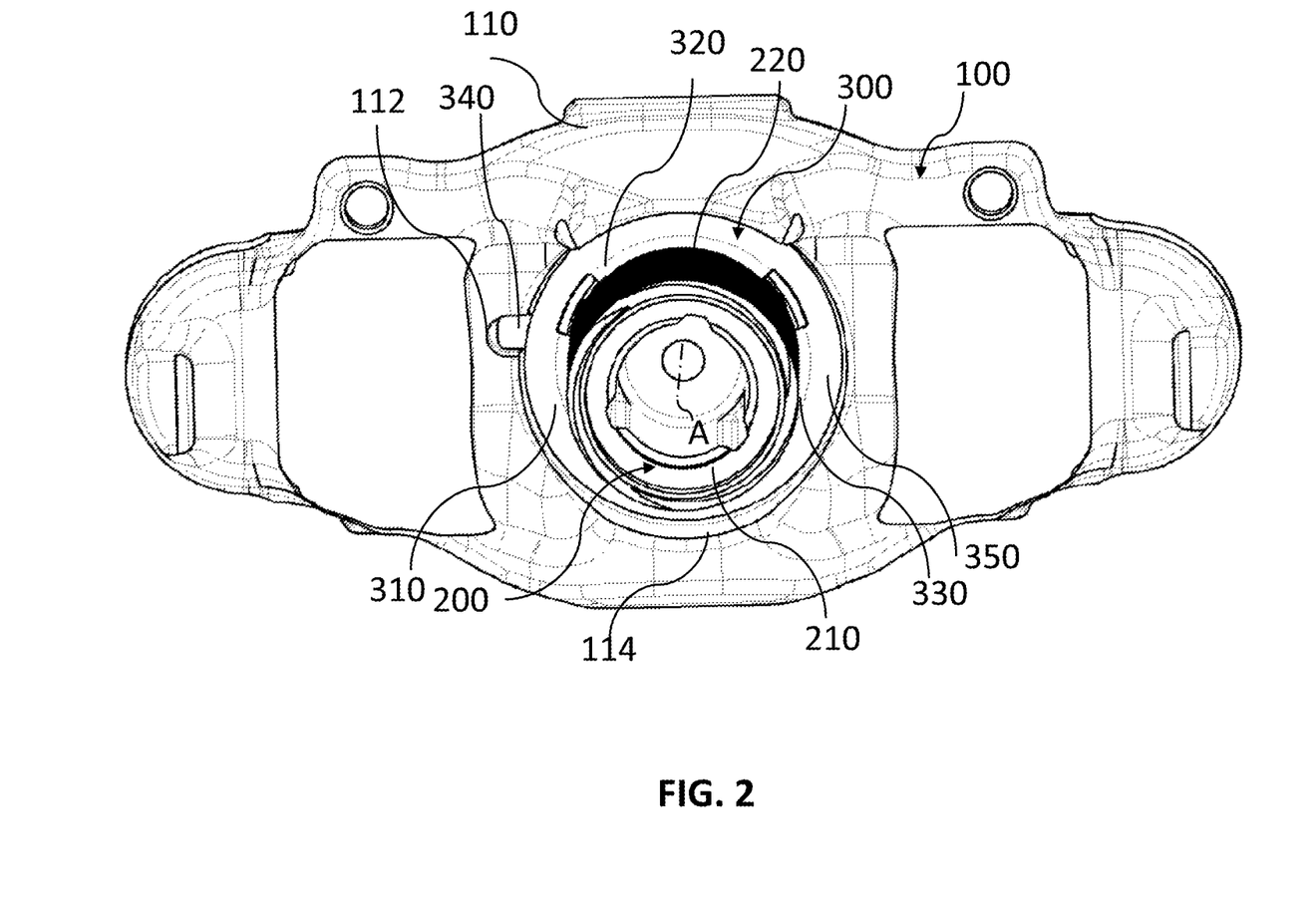
Figure 3:
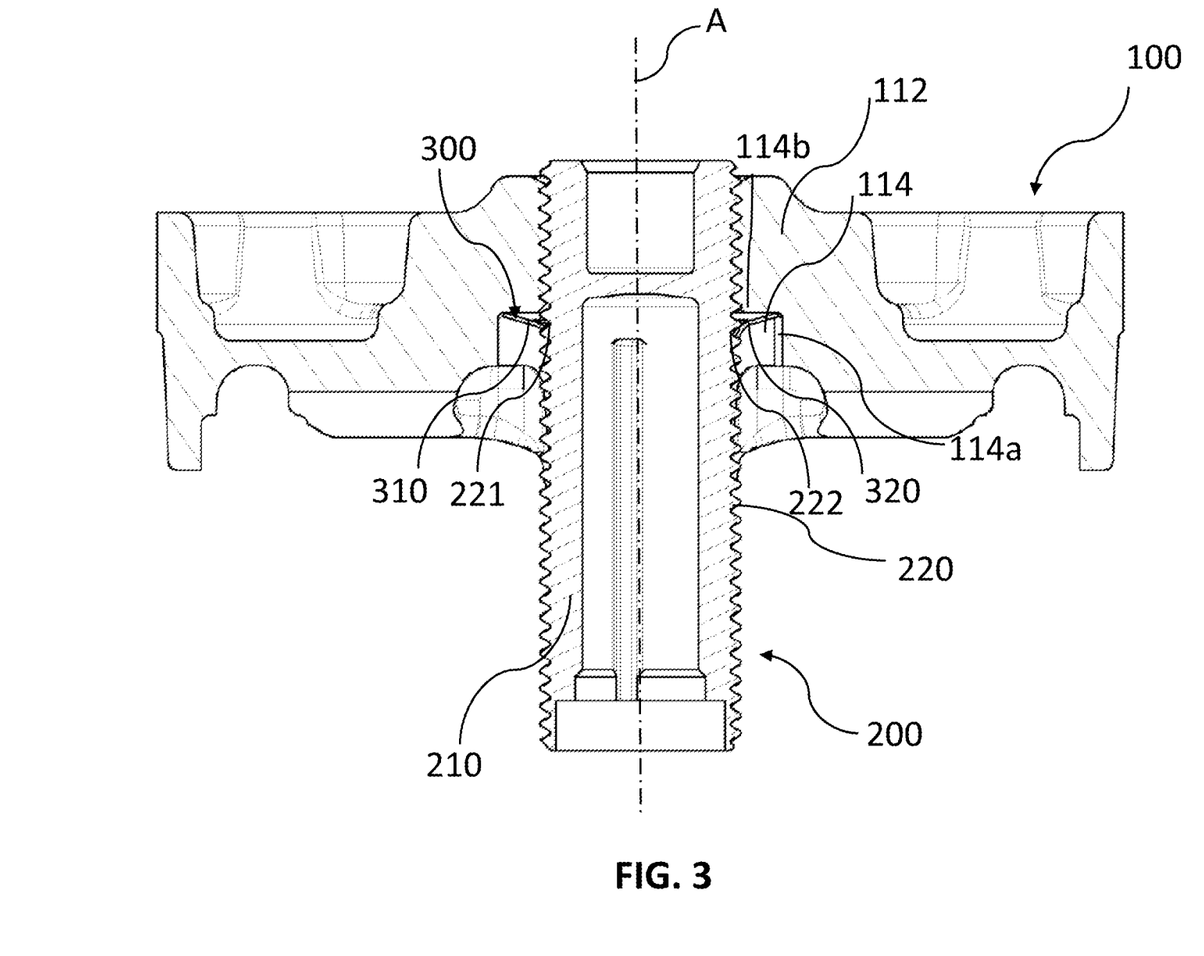
Figure 4:
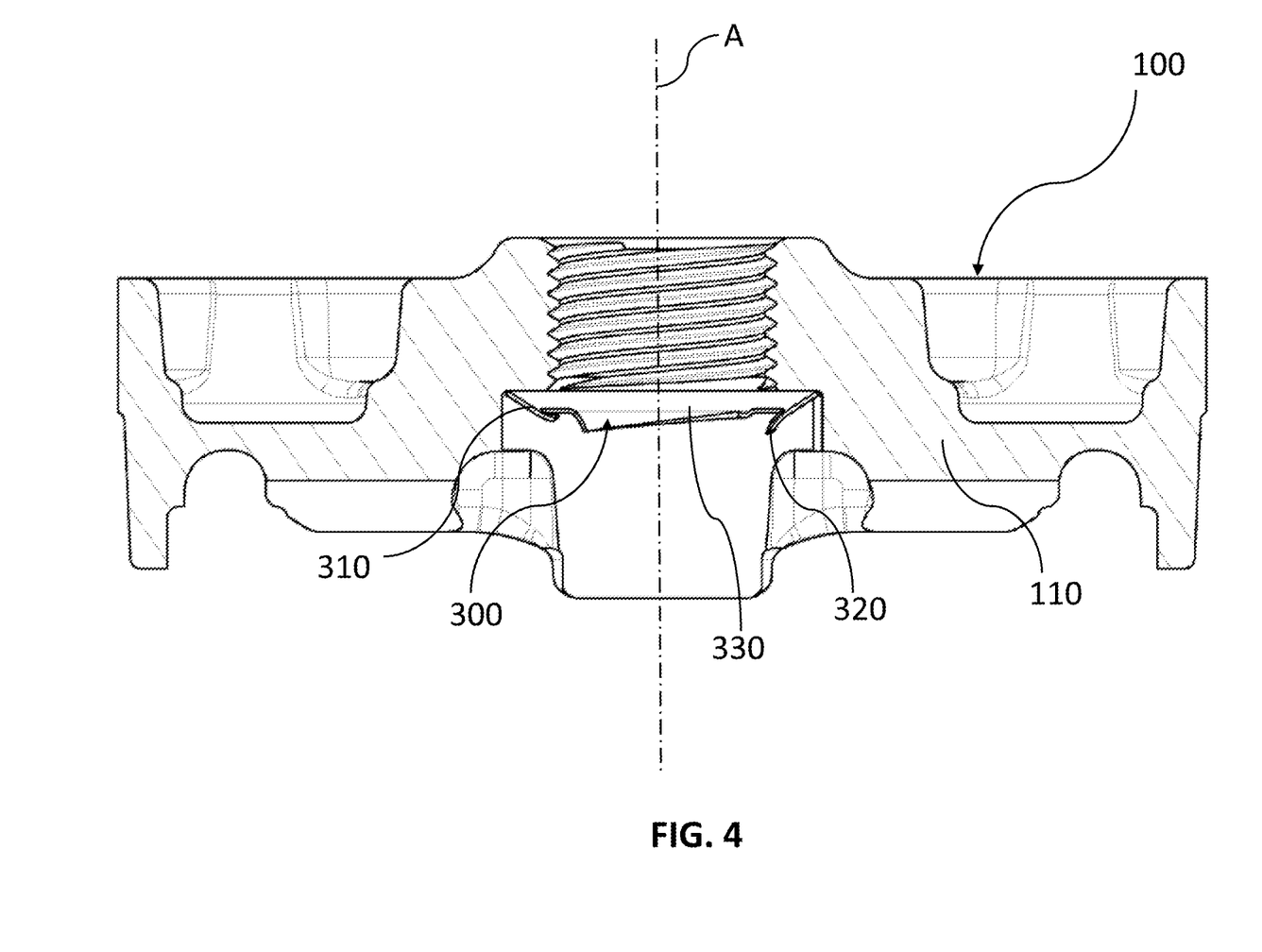
FIG. 4 illustrates a part of the brake caliper, according to FIG. 1, in a part-sectional side view.

FIGS. 2 to 4 illustrate the clamping unit 100, the adjuster unit 200 and the spring unit 300 in an assembled state.

FIG. 2 illustrates the clamping unit 100 in a perspective view. The clamping unit 100 includes a thrust piece 110 configured to be movably mounted in the brake caliper 10 (see FIG. 1), the adjuster unit 200 being in threaded engagement with the thrust piece 110, and the spring unit 300 being operatively coupled to the adjuster unit 200 and the thrust piece 110 and configured to apply a spring force in an axial direction A between the thrust piece 110 and the adjuster unit 200.

The spring unit 300 is coaxially arranged with the adjuster unit 200.

The thrust piece 110 includes a mounting interface 112 engaging the spring unit 300 in a positive connection, and includes a recess 114 corresponding to the spring unit 300 and receiving the spring unit 300 at least partly.

The adjuster unit 200 includes an adjuster screw 210 in threaded engagement with the thrust piece 110.

As best shown in FIG. 3, the adjuster unit 200 further includes a latching interface 220 that is formed as an external thread of the adjuster screw 210. The latching interface 220 extends along the axial direction A.

As shown in FIG. 3, the latching interface 220 includes a first thread pitch 221 and a second thread pitch 222 engaged by the spring unit 300.

The adjuster screw 210 is partly received in the thrust piece 110 such that the latching interface 220 is in threaded engagement with an internal thread (shown in FIG. 4) of the thrust piece 110.

As shown in FIGS. 2 to 4, the spring unit 300 has a first latching element 310, a second latching element 320 and a third latching element 330 configured to engage the latching interface 220.

The spring unit 300 further includes a mounting element 340 in engagement with the mounting interface 112 of the thrust piece 110.

Figure 5:
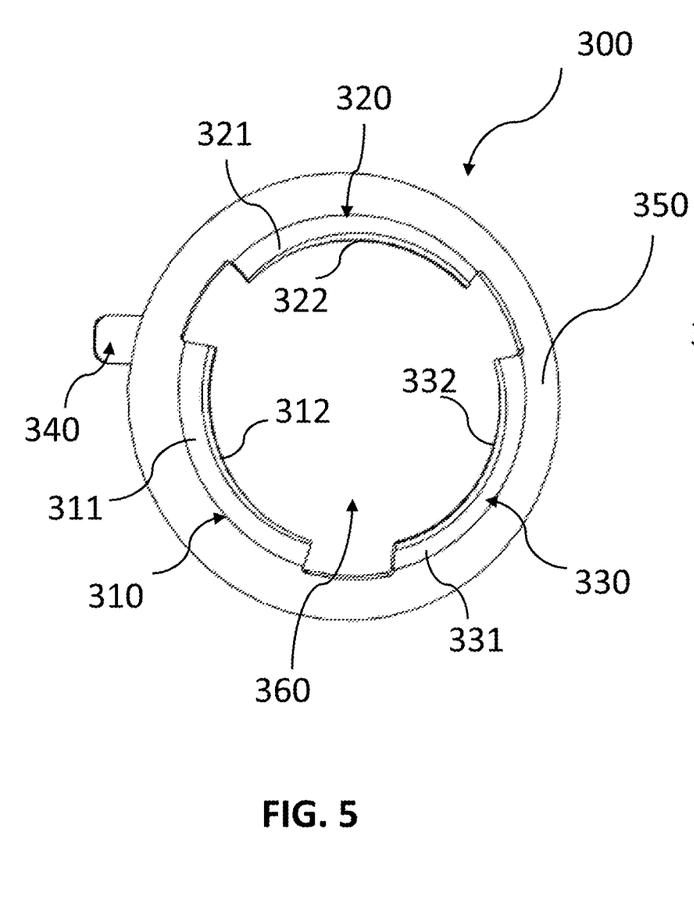
FIG. 5 illustrates a spring unit for the brake caliper, according to FIG. 1, in a top view.
Figure 6:
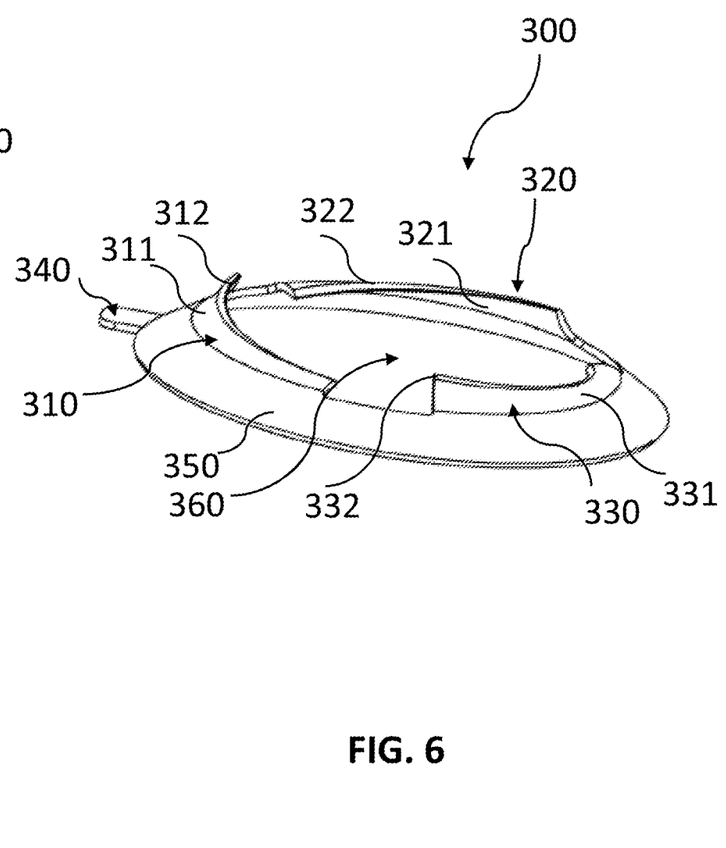
FIG. 6 illustrates the spring unit, according to FIG. 4, in a perspective view.

The spring unit 300 further includes a ring portion 350 extending radially outwards from a central, generally circular, aperture 360 (see FIGS. 5 and 6).

The mounting element 340 extends radially outwards from the outer circumference of the ring portion 350.

As best shown in FIG. 3, the first latching element 310 engages a first thread pitch 221 of the latching interface 220. The second latching element 320 engages a second thread pitch 222 of the latching interface 220.

As apparent from FIGS. 3 and 4, the outer circumference of the ring portion 350 (see FIGS. 5 and 6) rests against the thrust piece 110 and is supported by recess 114. In particular, the spring unit 300 is supported in the radial direction by an inner circumferential side wall 114a of the recess 114 and in the axial direction A by a bottom surface 114b of the recess 114.

FIGS. 5 and 6 illustrate the spring unit 300 having the latching elements 310, 320 and 330.

The spring unit 300 further includes the central aperture 360 configured to receive the adjuster unit 200 at least partly.

The mounting element 340 extends radially outwards from the outer circumference of the ring portion 350.

The spring unit 300 further includes the ring portion 350 extending radially outwards from the central aperture 360.

The latching elements 310, 320, 330 extend radially inwards from the ring portion 350. Each of the latching elements 310, 320, 330 has a curved surface 311, 321, 331 with a front edge 312, 322, 332, wherein the front edge 312, 322, 332 is received in a corresponding thread pitch when engaging the latching interface 220 (see FIG. 3) of the adjuster unit 200 (see FIG. 2).

Each of the curved surfaces 311, 321, 331 is formed corresponding to the curvature of one of the thread pitches such that the latching elements 310, 320, 330 engage the corresponding thread pitch.

It should of course be understood that various modifications and changes in form or detail could readily be made without departing from the spirit of the invention according to the present disclosure. It is therefore intended that the invention may not be limited to the exact form and detail shown and described herein, nor to anything less than the whole of the invention disclosed herein and as claimed hereinafter. Further, the features described in the description, the drawings, and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does not exclude a plurality.

The invention claimed is:

1. A brake caliper (10) for a vehicle disc brake, the disc brake having a pair of brake pads (20a, b), and a brake disc (30) positioned in between the brake pads (20a, b), the brake caliper (10) comprising:
   a thrust piece (110) movably mounted in an axial direction (A) in the brake caliper (10), wherein the thrust piece (110) is configured to move at least one of the brake pads (20a, b) relative to the brake disc (30),
   an adjuster unit (200) in threaded engagement with the thrust piece (110), and
   a spring unit (300) operatively coupled to the adjuster unit (200) and the thrust piece (110) and configured to apply a spring force in the axial direction (A) between the thrust piece (110) and the adjuster unit (200),
   wherein the spring unit (300) has a latching element (310, 320, 330) and the adjuster unit (200) includes a corresponding latching interface (220), wherein the latching element (310, 320, 330) is arranged to engage the latching interface (220) when the adjuster unit (200) is in threaded engagement with the thrust piece (110), and
   wherein the spring unit (300) includes a mounting element (340) in engagement with the thrust piece (110) to provide a resistance against a rotational movement the adjuster unit (200) relative to the thrust piece (110).

2. The brake caliper (10) according to claim 1, wherein the spring unit (300) is coaxially arranged with the adjuster unit (200) and has a central aperture (360) receiving the adjuster unit (200) at least partly.

3. The brake caliper (10) according to claim 2, wherein the spring unit (300) includes a conic-shaped ring portion (350) extending radially outwards from the central aperture (360).

4. The brake caliper (10) according to claim 1 wherein the latching element (310) is a first latching element engaging the latching interface (220) at least partly, and the spring unit (300) further includes at least one second latching element (320) spaced apart from the first latching element (310) in circumferential direction, wherein the second latching element (320) engages the latching interface (220) at least partly.

5. The brake caliper (10) according to claim 1, wherein the latching interface (220) of the adjuster unit (200) is an external thread extending in the axial direction (A) and having multiple thread pitches (221, 222), and wherein the latching element (310, 320, 330) is arranged to engage one of the thread pitches (221, 222).

6. The brake caliper (10) according to claim 1, wherein the adjuster unit (200) includes an adjuster screw (210) in threaded engagement with the thrust piece (110), and wherein the latching interface (220) is an external thread of the adjuster screw (210).

7. The brake caliper (10) according to claim 5, wherein the latching element (310, 320, 330) has a curved surface (311, 321, 331) that corresponds to a curvature of one of the thread pitches (221, 222).

8. The brake caliper (10) according to claim 5, wherein the latching element (310, 320, 330) extends radially inwards and includes a front edge (312, 322, 332) facing the latching interface (220), wherein the front edge (312, 322) is at least partly received in the thread pitches (221, 222).

9. The brake caliper (10) according to claim 4, wherein the first latching element (310) engages a first thread pitch (221) of the latching interface (220) and the second latching element (320) engages a second thread pitch (222) of the latching interface (220).

10. The brake caliper (10) according to claim 1, wherein the thrust piece (110) includes a mounting interface (112) corresponding to the mounting element (340) of the spring unit (300), wherein the mounting interface (112) engages the mounting element (340) in a positive connection.

11. The brake caliper (10) according to claim 10, wherein the mounting interface (112) is configured to engage the mounting element (340) in response to an axial movement of the spring unit (300) towards the thrust piece (110).

12. The brake caliper (10) according to claim 10, wherein the mounting element (340) extends radially outwards, and the mounting interface (112) is sized and shaped to receive the mounting element (340) at least partly.

13. The brake caliper (10) according to claim 1, wherein the thrust piece (110) has a recess (114) corresponding to the spring unit (300) and configured to receive the spring unit (300) at least partly.

14. A spring unit (300) for a brake caliper (10) of a vehicle disc brake, wherein the spring unit (300) is configured to be operatively coupled to an adjuster unit (200) and a thrust piece (110) of the brake caliper (10) and configured to apply a spring force in an axial direction (A) between the thrust piece (110) and the adjuster unit (200),
wherein the spring unit (300) has a latching element (310, 320, 330) arranged to engage a latching interface (220) of the adjuster unit (200) when the adjuster unit (200) is in threaded engagement with the thrust piece (110), and
wherein the spring unit (300) includes a mounting element (340) configured to be in engagement with the thrust piece (110) to provide a resistance against a rotational movement the adjuster unit (200) relative to the thrust piece (110).

15. The spring unit (300) according to claim 14, wherein the mounting element (340) of the spring unit is configured to correspond to a mounting interface (112) of the thrust piece (110), wherein the mounting element (340) is configured to engage the mounting interface (112) in a positive connection.

16. The spring unit (300) according to claim 15, wherein the mounting element (340 is configured to engage the mounting interface (112) in response to an axial movement of the spring unit (300) towards the thrust piece (110).

17. The spring unit (300) according to claim 15, wherein the mounting element (340) extends radially outwards, and the mounting element (340) is sized and shaped to be receive in the mounting interface (112) at least partly.

18. The spring unit (300) according to claim 14, wherein the spring unit (300) is configured to be coaxially arranged with the adjuster unit (200) and has a central aperture (360) configured to receive the adjuster unit (200) at least partly.

19. The spring unit (300) according to claim 18, wherein the spring unit (300) includes a conic-shaped ring portion (350) extending radially outwards from the central aperture (360).

20. The spring unit (300) according to claim 14, wherein the latching element (310) is a first latching element configured to engage the latching interface (220) at least partly, and the spring unit (300) further includes at least one second latching element (320) spaced apart from the first latching element (310) in circumferential direction, wherein the second latching element (320) is configured to engage the latching interface (220) at least partly.

21. A brake caliper (10) for a vehicle disc brake, in particular an air disc brake of a commercial vehicle, the disc brake having a pair of brake pads (20a, b), and a brake disc (30) positioned in between the brake pads (20a, b), the brake caliper (10) comprising:
a thrust piece (110) movably mounted in an axial direction (A) in the brake caliper (10), wherein the thrust piece (110) moves at least one of the brake pads (20a, b) relative to the brake disc (30),
an adjuster unit (200) in threaded engagement with the thrust piece (110), and
a spring unit (300) operatively coupled to the adjuster unit (200) and the thrust piece (110), wherein the spring unit applies a spring force in the axial direction (A) between the thrust piece (110) and the adjuster unit (200),
wherein the spring unit is disposed axially between the thrust piece (110) and the adjuster unit (200);
wherein the spring unit (300) has a latching element (310, 320, 330) and the adjuster unit (200) includes a corresponding latching interface (220), wherein the latching element (310, 320, 330) is arranged to engage the latching interface (220) when the adjuster unit (200) is in threaded engagement with the thrust piece (110), and
wherein the spring unit (300) includes a radially extending mounting element (340) disposed in a positive connection with a recessed mounting interface (112) defined in the thrust piece (110);
wherein the positive connection blocks rotation of the spring unit (300) relative to the thrust piece (110);
wherein the spring unit is in the form of a closed loop ring that extends fully circumferentially around the adjuster unit (200).

* * * * *